US010288979B1

(12) United States Patent
Wang et al.

(10) Patent No.: US 10,288,979 B1
(45) Date of Patent: May 14, 2019

(54) TERAHERTZ IMAGING SYSTEM USING TUNABLE FISHNET METAMATERIALS

(71) Applicant: National Tsinghua University, Hsinchu (TW)

(72) Inventors: Wei-Chih Wang, Hsinchu (TW); Chi-Leung Tsui, Seattle, WA (US); Da-Jeng Yao, Hsinchu (TW)

(73) Assignee: National Tsinghua University, Hsinchu (TW)

( * ) Notice: Subject to any disclaimer, the term of this patent is extended or adjusted under 35 U.S.C. 154(b) by 0 days.

(21) Appl. No.: 15/838,604

(22) Filed: Dec. 12, 2017

(51) Int. Cl.
*G02F 1/29* (2006.01)

(52) U.S. Cl.
CPC .......... *G02F 1/29* (2013.01); *G02F 2203/13* (2013.01); *G02F 2203/24* (2013.01)

(58) Field of Classification Search
CPC ..... G02F 1/29; G02F 2203/13; G02F 2203/24
USPC ......... 250/334, 336.1, 338.1, 347, 348, 353, 250/354.1
See application file for complete search history.

(56) References Cited

U.S. PATENT DOCUMENTS

| 2010/0148050 | A1* | 6/2010 | Bari | ................ | B82Y 20/00 250/271 |
| 2010/0301971 | A1* | 12/2010 | Yonak | ................ | H01P 1/20381 333/219.1 |
| 2012/0008140 | A1* | 1/2012 | Khan | ................ | G01N 21/3581 356/326 |
| 2013/0335256 | A1* | 12/2013 | Smith | ................ | G01S 13/887 342/22 |
| 2014/0211298 | A1* | 7/2014 | Sayyah | ............. | H01Q 15/0086 359/298 |
| 2015/0276489 | A1* | 10/2015 | Cumming | ............. | G01J 5/0881 250/338.3 |
| 2015/0316511 | A1* | 11/2015 | Guo | ........................ | H04B 10/27 398/140 |
| 2018/0226724 | A1* | 8/2018 | Suzuki | ..................... | H01P 1/00 |

* cited by examiner

*Primary Examiner* — David P Porta
*Assistant Examiner* — Blake C Riddick
(74) *Attorney, Agent, or Firm* — Lin & Associates Intellectual Property, Inc.

(57) ABSTRACT

The present disclosure describes the design and fabrication of a Terahertz (THz) beam steering device and a multifunctional patternless flat lens using electro-optic tunable fishnet materials (TFMM) to create a portable THz imaging system. The THz beam steering device and multifunctional patternless flat lens utilize a tunable resonant frequency of TFMM (with a negative refraction index) to achieve a maximum beam steering angle (field of view) and beam modulation. The portable THz scanning system is made by combining the TFMM beam steering device with a pair of continuous wave (CW) photomixer modules powered by two tunable CW lasers with built-in optical isolators, a fiber-optic beam combination and a multifunctional flat lens.

17 Claims, 12 Drawing Sheets

TERAHERTZ IMAGING SYSTEM USING TUNABLE FISHNET METAMATERIALS

BACKGROUND OF THE INVENTION

1. Field of the Invention

The present disclosure relates to a Terahertz (THz) imaging system, and more particularly, to a THz beam steering device and a multifunctional patternless flat lens using electro-optic tunable fishnet metamaterials (TFMM) for a portable THz imaging system.

2. The Prior Arts

Terahertz (THz) radiation is in a unique frequency range (0.1~10 THz) where it can penetrate most dielectric materials without substantial attenuation. Located between the infrared and microwave frequencies, low-cost THz light sources and detectors are still under development, creating a "THz gap" in science and engineering. Closing this gap means that the penetrating ability of THz radiation can be harnessed to observe internal material properties and construct THz images. Compared to x-rays, the low energy level of THz radiation (meV versus keV, respectively) makes it ideal for biological imaging, health monitoring, medical diagnostics and security.

Over the last two decades, the development of Terahertz (THz) frequency components has allowed science to begin looking into the previously unexplored "THz Gap" of the electromagnetic spectrum using THz sources, detectors, beam splitters, polarizers, and lenses. With THz-range technology applications including bio-chemical sensing, spectroscopy, bio-imaging, security systems and communications, this relatively young field has gained a lot of commercial attention. Traditionally, those applications are implemented by steering electromagnetic (EM) waves in free space via bulky and diffraction-limited systems or CCD-like camera systems in the form of micro bolometers or CMOS transistor arrays.

These technologies face many challenges. First is that all the sources have low power and efficiency, principally because the efficiency and power of radio frequency devices fall inversely with the second-to-fourth power of the frequency, and lack of simple efficient ways to generate broadband THz radiation. Most of the sources can be divided into three categories: particle-accelerator-based sources, microwave/electronic-based sources and optic-based sources. Devices in the particle-accelerator-based source category include backward-wave oscillators, travelling wave tubes, extended interaction klystron, gyrotrons, free electron lasers and synchrotrons. Particle-accelerator-based sources are very broadband (0.01 to 20 THz), however, they are large in size and require a complex setup. An example of this is a new compact versatile linear accelerator named FLUTE that is currently being designed at the Karlsruhe Institute of Technology where a 42 MeV machine is being used to generate strong (several 100 MV/m) ultra-short (~1 ps) THz pulses (up to ~4-25 THz). Microwave/electronic-based sources are more compact, generate continuous waves whose power has a narrow line width at room temperature, but the metallic structure suffers high power loss plus the current operating frequencies are limited to around or mostly below 1 THz. One approach that has been reported is based on the extension of microwave technology (e.g., backward wave oscillator, Gunn diode or YIG oscillator), which is multiplied to the required frequency. The highest frequency generated with these sources is 1.9 THz that gives an output power of 20 µW. Another is GaN IMPATT diodes which show they are capable of generating a much higher RF power (at least 2.5 W) at around 1.45 THz with high efficiency (17-20%). The optic-based sources category presents the most variety of sources. These can be divided into either solid-state sources, or THz gas lasers. Solid-state sources are either laser sources (semiconductor lasers, THz quantum cascade lasers) or laser-pumped sources (optically pumped THz lasers such as $CO_2$ Pumped Gas Laser, photoconductive antenna, photomixers, nonlinear crystal/polymer difference-frequency generators, optical rectification-based source, etc.). Optic based sources yield the high average power in THz frequency and can be pulsed or continuous wave, but thermal noise becomes an issue at lower frequency, so much that aggressive cooling is necessary, leading to a bulky apparatus. Optic-based solid-state laser sources are tunable, compact and easily operatable probably the best option out of all, and output powers in excess of 100 mW (pulsed). Quantum cascade lasers have a power output between 1 µW and 10 mW, and cover a frequency from 1.2 to 3.22 THz. Recent report shows a 90 mW system operates in the frequency range of 1.9 to 4.8 THz has been achieved. These lasers require a cryogenic cooling system, have an efficiency of about 50%, but are hard to operate in the short pulse. Photoconductive antennas utilize pulse or continuous wave laser to generate THz radiation. Normally there is a limit in the power input thus it limits its THz output generation (<3 mW). Photomixers use two lasers either continuous wave or pulsed by optical heterodyning in high bandwidth nonlinear material/device such as GaP, GaSe, InGaAs, DAS to convert into THz radiation exactly at the difference frequency of the lasers. If tunable lasers are used, output frequencies can be adjusted. The THz dual laser InGaAs system made by Toptica shows as high as 65 µW or dynamic range of power exceed 90 dB at 100 GHz and 50 dB near 1 THz. Optical rectification is most commonly used method to generate 0.1 to 5 THz. It basically requires the illumination of a crystal or semiconductor with a very short optical laser pulse (sub picosecond) to create a terahertz pulse corresponding to the optical pulse.

THz detectors and imaging devices also need to develop more compact systems with higher sensitivity and faster response time. THz detectors are either thermal sensors, semiconductor devices or coherent detectors. Typical thermal detectors include Golay cell, bolometer and pyroelectric devices. Golay cell is an opto-acoustic detector using optical technique to detect a deformed diaphragm due to a gas expansion from an infrared radiation absorption. Detector has an operating range of 30 GHz to 3 Thz and a NEP <5 µW/Hz1/2, however, the system is fragile, highly sensitive to vibration, and has a very slow response time (typical rise time of 25 ms). Bolometer detects thermal induced resistance change. For a hot electron bolometer, increase in resistance is due to an increase in electron temperature due to free carrier absorption. The device has relatively fast response (~106 Hz), however it requires cooling to liquid helium temperatures. More recently, the micro bolometer large array cameras have started showing up in the market for imaging application. Companies such as CEA-LETI developed an antenna coupled micro bolometer camera with 320×230 50 µm pitch pixels operating at 1.5 to 3.5 THz with noise-equivalent power (NEP) <30 pW/Hz1/2 at 2.5 THz. Other companies like NEC also developed a similar resolution (320×240 23.5 µm pixels, more recent 640×480-pixel array) micro bolometer camera with slight higher NEP <100 pW/Hz1/2 (<10 pW Hz1/2 later version) at 3 THz and 0.5-0.6 THz frequency range. Another company INO also developed a 384×288 35 µm pixel pitch operating between 0.1 and 7 THz with NEP <70 pW at 4 THz camera. For the detection of THz radiation, especially from continuous wave (CW) sources, the choice of commercially available solutions is very limited. Pyroelectric (PE) detectors due to their lowcost and ability to operate at room temperature and provide sufficiently fast response usually become favorite for many application. PE detectors are essentially big capacitors, therefore electronic RC time constant is long (bandwidth ~30 Hz. NEP is comparable to Golay. Semiconductor detector such as Schottky-diodes have been the only available technology for the detection of THz radiation from 800 GHz to 2.5 THz. Key advantages of diode based detectors are that they do not require cooling to cryogenic temperatures and they cover a wide frequency range up to several THz. The main disadvantages are the poor sensitivity and the high local oscillator (LO) power requirement. The LO is still a critical element for heterodyne detection in the THz frequency range. Solid state sources often do not provide enough power for the heterodyne operation in the THz range but are under development right now. Schottky diodes are polarization-dependent and state a significant cost factor. Various CMOS based detector and detector array have been developed below 1 THz. One of the benefit of this approach is its ability to be processed with a standard industrial silicon technology. One of the examples is the video-rate 1-kpixel (32×32) 2.5 µW/pixel 25 fps (5 kfps possible at video mode) CMOS camera developed at the University of Wuppetal. The sensor is a FET transistor based advertised to have a range between 50 GHz to 1 THz and sensitivity of 7 nW/pixel at 0.9 THz. Coherent detectors can be done in use of free-space photoconducting antennas or electro-optic sampling. Traditional coherent THz radiation detection schemes involve the use of gated photoconducting antennas as detectors for freely propagating THz electromagnetic waves. This is true both for THz spectroscopy and for THz imaging systems. The photoconductive (PC) antenna gated with ultrashort optical pulses has been a key device in the recent development of THz optoelectronics. Owing to its high efficiency and good signal-to-noise ratio (SNR), the PC antenna has been used for the coherent detection of the electromagnetic transients in the range of THz frequency. EO sampling technique shows good sensitivity and a broad bandwidth, compared to antenna detection. Electrooptic sampling is an optoelectronic technique of optical sampling, realized via exploiting the Pockel effect. The electric field is exercised by an ultrashort optical pulse, an EO probe beam, and the influence between the electric field and the terahertz radiation occurs during only a short time interval. This effect is usually a change of polarization, which is turned into a change of optical power by a polarizer. A polarizing beam splitter, which can be viewed as a second polarizer rotated 90° from the first polarizer, is used to split and direct the polarization rotation that the THz field induces on the probe beam and to achieve intensity modulation of the polarization. The advantage of the EO is that it can be used in real-time single-pixel THz imaging with comparable SNR and a larger bandwidth compared to PC, when fast lock-in detection is used.

THz imaging systems come in two configurations. One is utilizing an array detector similar to a CCD camera in lower frequency spectra for image detection, and the other is reconstructing an image from an area scanned by a single pixel detector. The main challenges for CCD camera-like systems are sensitivity, resolution and cost, as discussed earlier. There are several commercially available camera systems in the form of micro bolometers or CMOS transistor arrays. However, most have a limited range of operation (although some are broadband, 0.1 to 7 THz) and the operation is still highly dependent on the light source. Therefore, the challenge is to come up with a system that is more robust, simpler in design, more cost effective to manufacture, while maintaining the compact size and broadband operation.

The scanning based system (or single pixel THz system) provides some of the solutions to the current bolometer and CMOS camera system. Commercial THz scanning-based imaging systems, such as T-ray 4000 from Picometrix Inc. is composed of a femtosecond laser, PC emitter and detector pair, lens system and mechanical stage. The primary advantage of a single pixel system is that the whole imaging process utilizes only a single light source and detector. Because all the light can be focused to a single point, the working distance can be expanded and sensitivity improved. The detection circuit is also simplified. However, even with the successful demonstration of the current commercial THz imaging systems such as T-ray 4000, the system still utilizes cumbersome mechanical stages for scanning. Moving either the light source or the sample to complete two-dimensional image scanning, these systems require a large stable system to accurately position the moving component. Replacing the mechanical stage with a non-mechanical THz beam steering device will make the system more compact, less expensive, and greatly improve the scanning speed and accuracy.

However, THz detectors and imaging devices still need to develop more compact systems with higher sensitivity and faster response time.

SUMMARY OF THE INVENTION

To overcome the aforementioned disadvantages of the conventional technology, the object of the present disclosure is to provide a Terahertz (THz) imaging system using tunable fishnet metamaterials (TFMM).

There are many possible embodiments for the proposed method. In one embodiment of the present disclosure, the THz imaging system includes a two-dimensional (2D) beam steering device, made of a tunable fishnet metamaterial (TFMM) that deflects a THz incident beam into a 2D scanning either in a raster, spiral or Lissajous pattern, by means of an electrical or electromagnetic input to electro-optic materials.

Moreover, the present disclosure provides a THz beam steering device and a multifunctional patternless flat lens using electro-optic TFMMs to create a portable THz imaging system. The THz beam steering device and the multifunctional flat lens utilize a tunable resonant frequency of TFMM with a negative refraction index to achieve a maximum beam steering angle (field of view) and beam modulation. A portable THz scanning system can be made by combining the TFMM beam steering device with a pair of continuous wave (CW) photomixer modules powered by two tunable CW lasers with built-in optical isolators, a fiber-optic beam combination and a multifunctional flat lens.

DETAILED DESCRIPTION OF THE PREFERRED EMBODIMENT

The present disclosure may be embodied in various forms, and the details of the preferred embodiments of the present disclosure will be described in the subsequent contents with reference to the accompanying drawings. The drawings (not to scale) show and depict only the preferred embodiments of the present disclosure, and will not be considered as limitations to the scope of the present disclosure. Modifications of the present disclosure should be considered within the spirit of the present disclosure.

Figure 1:
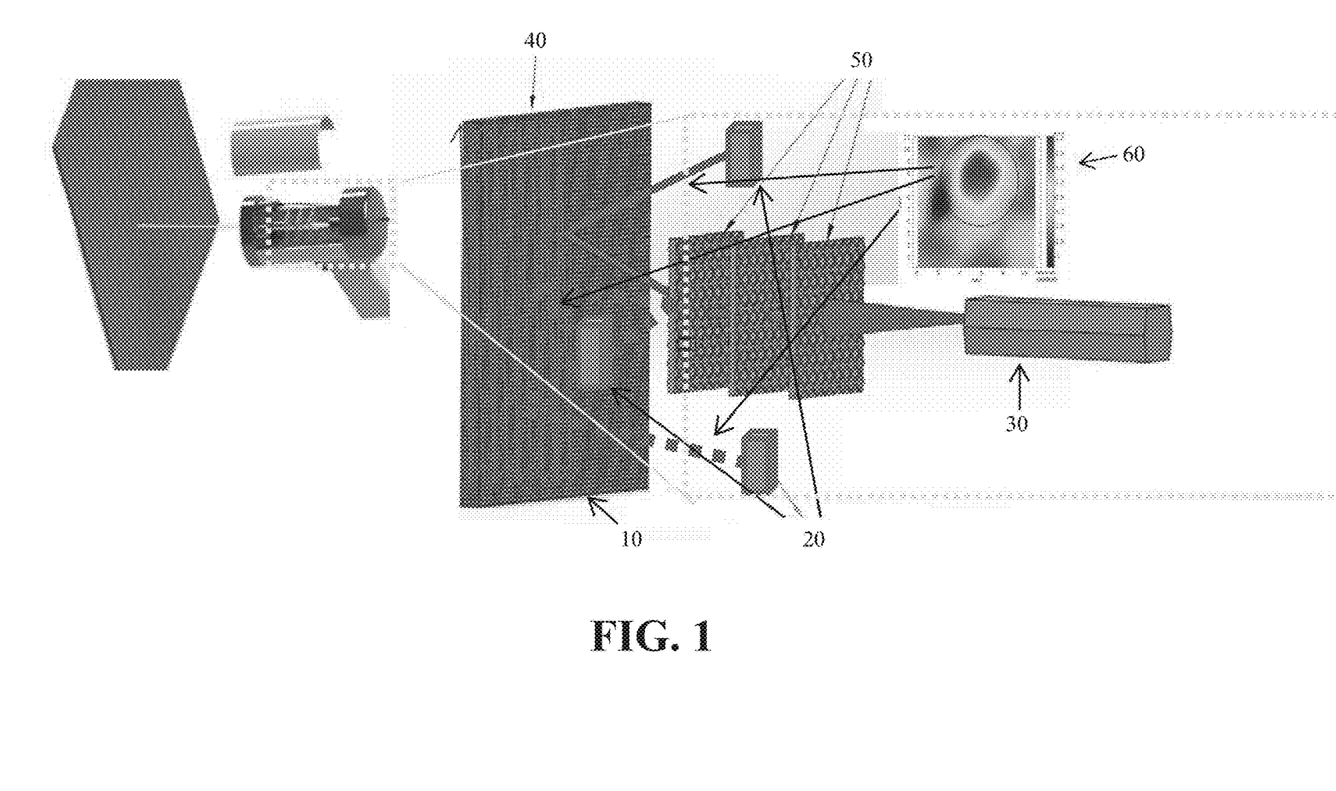
FIG. 1 shows a handheld THz scanning imaging system with a beam steering device and a multifunctional flat lens system according to the present disclosure.

The present disclosure is the employment of an electro-optic (EO) tunable fishnet metamaterials (TFMM) in a Terahertz (THz) frequency for a THz imaging and multifunctional flat lens system. An example of a real time scanning based THz imaging system is constructed based on combining a beam steering device and a multifunctional flat lens with continuous wave InGaAs based photomixer modules powered by two tunable distributive feedback lasers with built-in optical isolators and a fiber-optic beam combiner. When packaged, a hand-held THz camera embedded with the gradient TFMM provides a rapid-scanning, high FOV and resolution THz imaging system (as shown in FIG. 1). Multifunctional tunable active metamaterials also allow for shaping the beam and multiple-wavelength (e.g. 0.2 to 1.2 THz for a dual laser system and 2.0 to 2.7 THz if third DFB laser is implemented. Other range up to 4 THz can be tuned simply by combining different lasers such as femtosecond lasers or laser diodes with different tunable wavelength range 800 nm o 1.6 um) simultaneous diagnostic scans or spectroscopy. In short, as shown in FIG. 1, the present disclosure may include a test sample 10, a plurality of detector arrays 20, continuous wave InGaAs based photomixer modules 30 powered by two tunable distributive feedback lasers, a raster scanning THz beam 40 created by THz wave passing through beam steering array, a plurality of 2D beam steering and focusing collimating arrays 50 based on the electro-optic gradient metamaterials. As such, a THz image 60 will be generated based on the reflected intensity received by the detector from scanning THz wave on the test sample 10.

Figure 2:
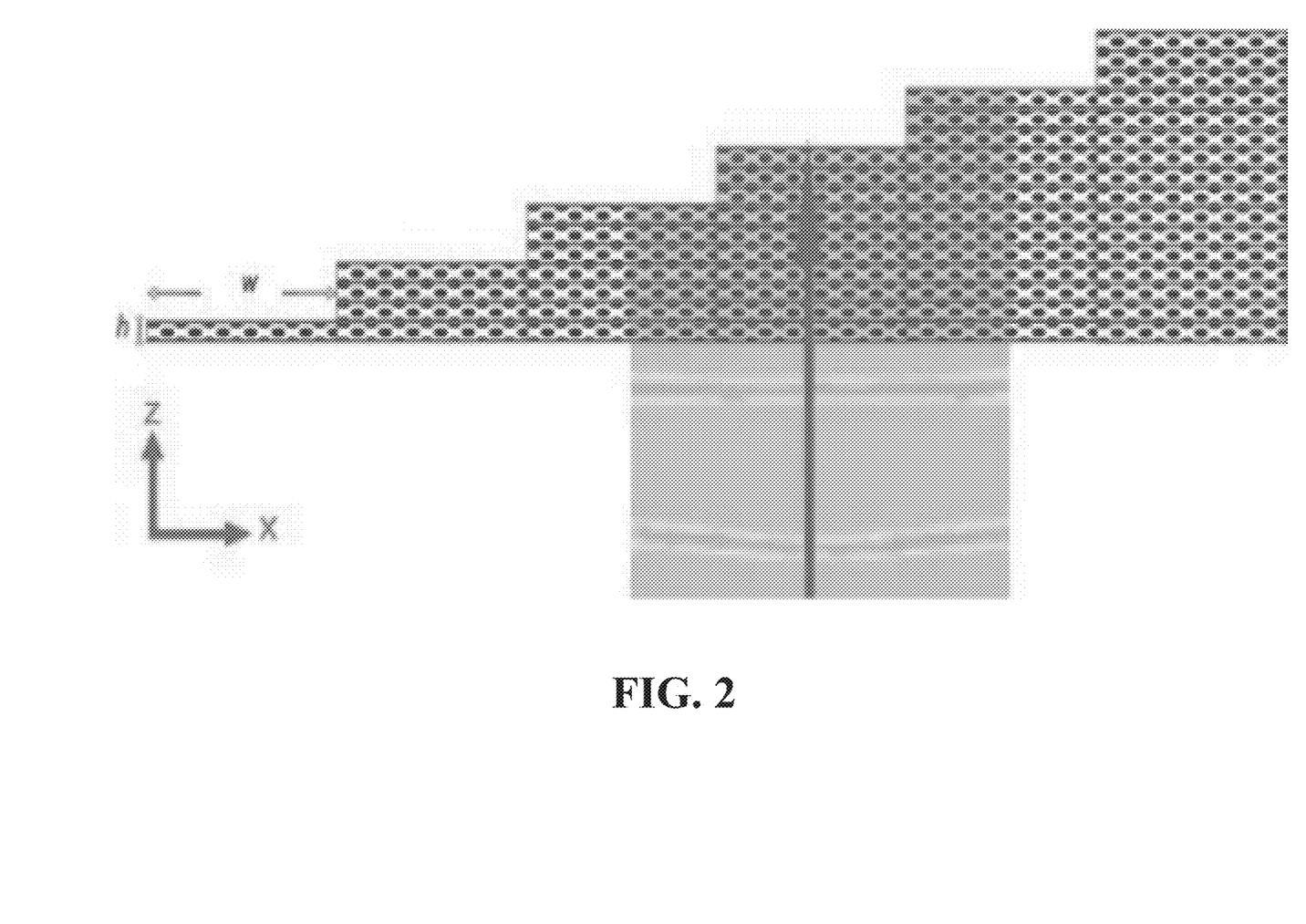
FIG. 2 is a TFMM prism design, where the width w and height h of a TFMM unit cell are 150 µm and 9.8 µm, respectively; the incident wave travels in the z direction and each three-layer increment of TFMM along the x direction creates 11.09° prism design.
Figure 4A:
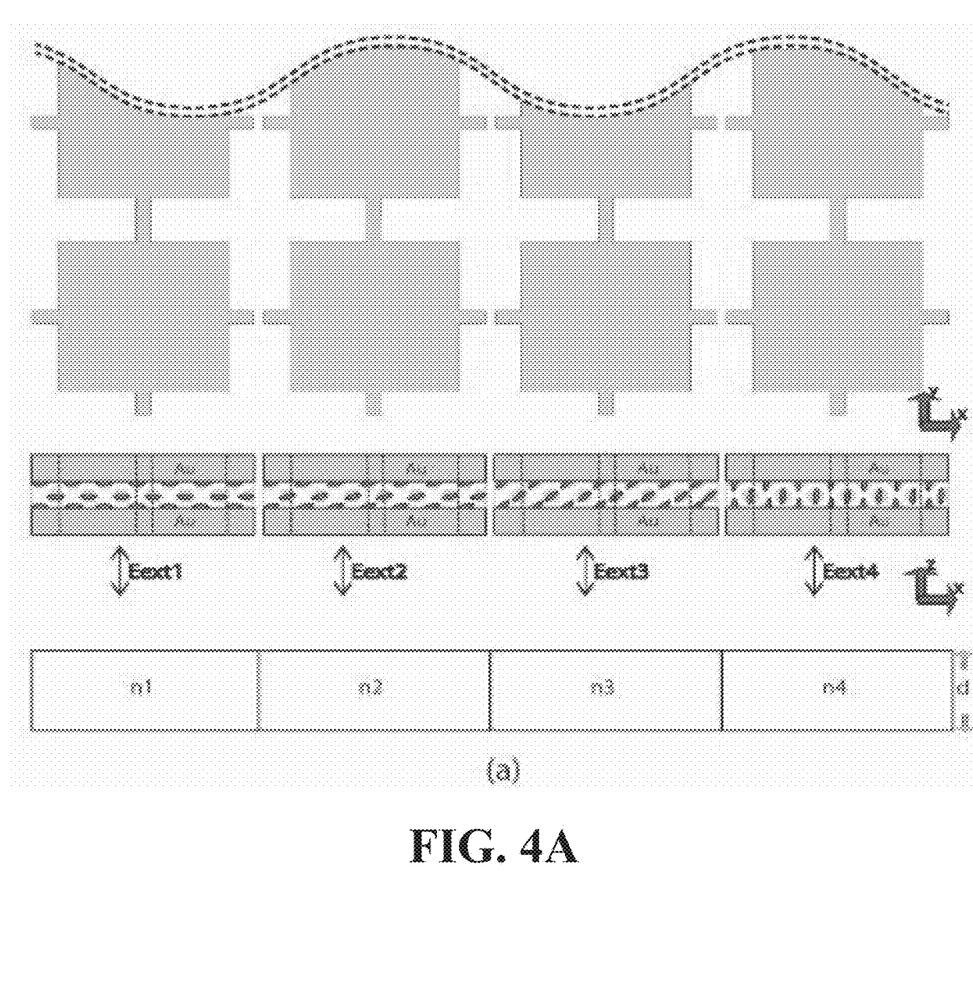
FIG. 4A shows disconnected TFMM resembling a flat prism, generating large OPD in the x direction.
Figure 4B:
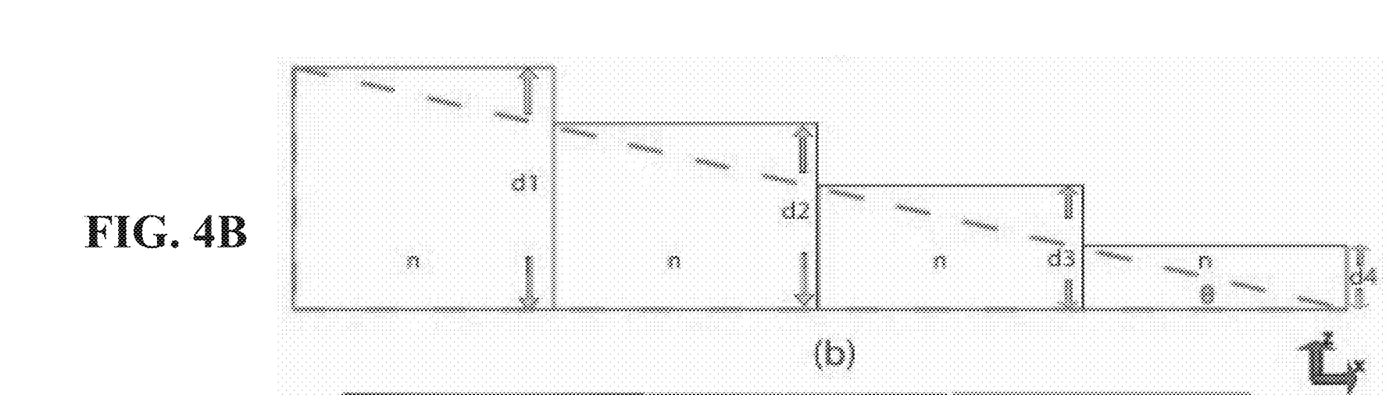
FIG. 4B shows a homogeneous material with different heights also generating OPD along the x direction equivalent to the flat prism.
Figure 4C:
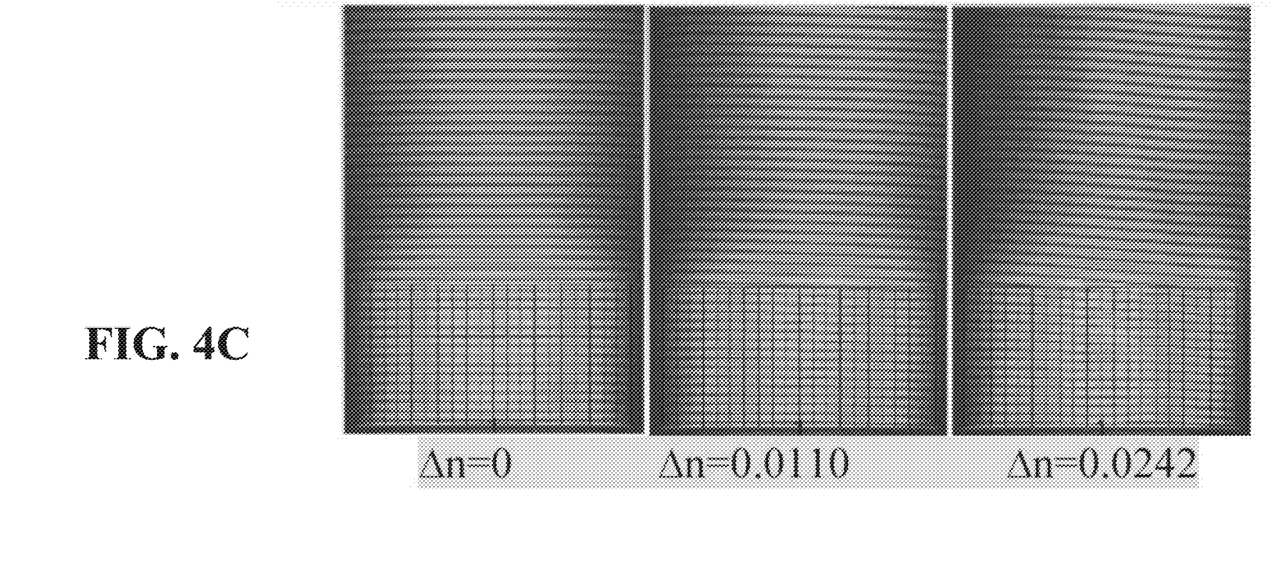
FIG. 4C shows CST deflection angle simulation.
Figure 5:
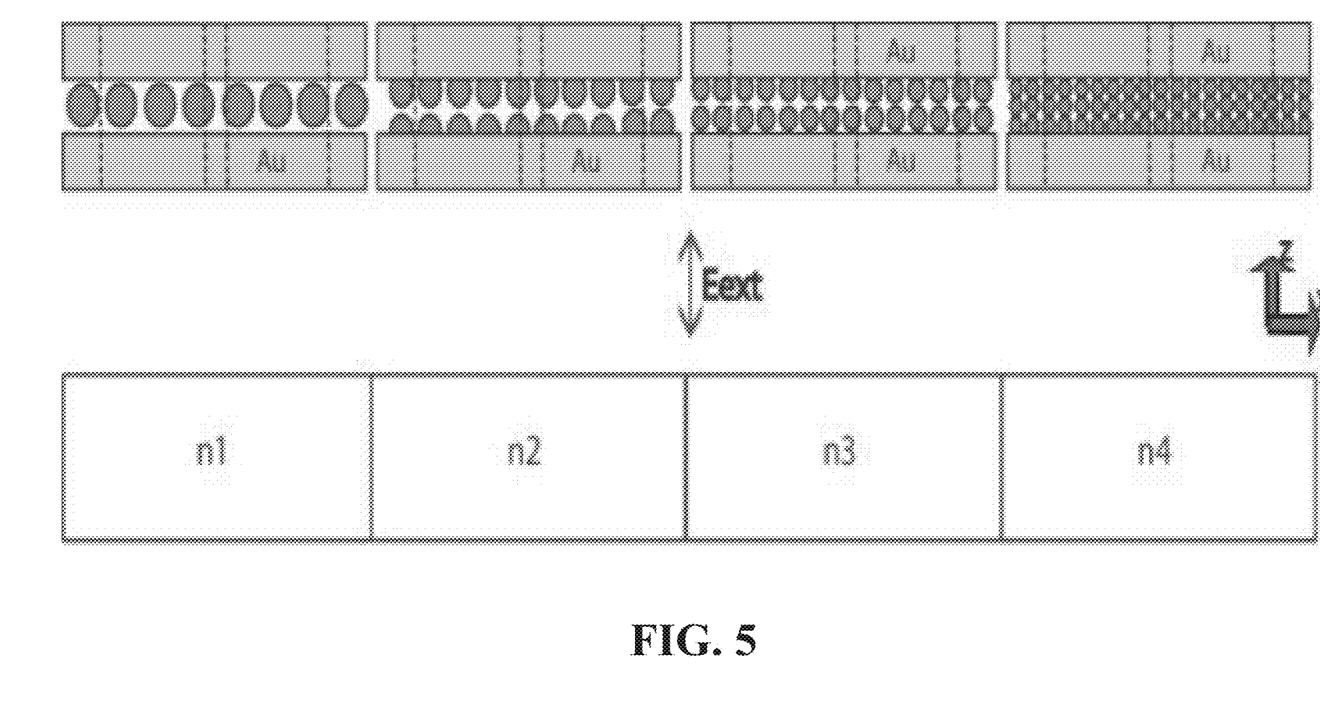
FIG. 5 shows a polymer dispersed liquid crystal (PDLC) droplet size, controlled by gray scale mask to form a gradient structure.

To design a THz beam steering device, two concepts are proposed: (i) a right triangle prism structure with multiple TFMM layers, as shown in FIG. 2 and (ii) a flat TFMM prism with either gradient external fields (as shown in FIGS. 4A-4C) or a gradient structure (as shown in FIG. 5).

(i) Physical TFMM Prism Design

Designing a TFMM prism for beam steering purpose is similar to a regular prism design, except that the fishnet is an anisotropic material which only allows normally incident beams. Therefore, a stacked fishnet prism design (see FIG. 2) is utilized to create a large optical path difference (OPD) needed to achieve large angle beam steering. In this right triangular prism structure, the beam bending is achieved by the optical path length difference (OPD) due to a relative geometry change (thickness) between adjacent steps. The angle and uniformity of the output beam profile will depend on the numbers of TFMM layers, the relative geometry between the steps and the operating frequency. The optical path length (OPL) of the incident electromagnetic wave can be formulated as follows:

$$OPL = \int_{d1}^{d2} n(s)ds \quad (1)$$

where s is the path of EM wave, n(s) is the refractive index as a function of s, and (d1–d2) is the thickness of the material. If the material is homogeneous, then the OPD can be written as $$OPD = n(d1-d2) \quad (2)$$

While the concept of using OPD to create a beam steering device is not complex, finding a material with a refractive index change large enough to steer the beam is not simple. For example, the ordinary and extraordinary states of 5CB liquid crystal can shift the refractive index from 1.55 to 1.65, resulting in a 13.3% OPD change when the thickness is constant. If a physical prism is made of 3 layered TFMM, the real part of refractive index (n') changes from −3.85 (LC aligned with the z axis) to −0.10 (LC aligned with the x axis) at 0.856 THz (see FIGS. 3A, 3B). The corresponding OPD change is 97%.

Figure 3A:
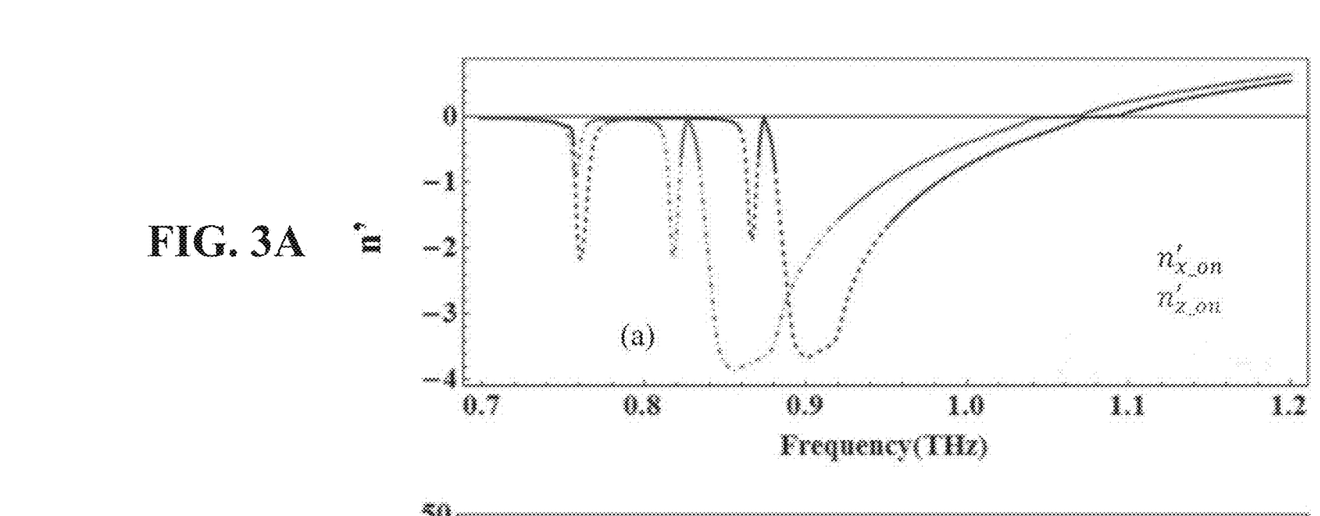
FIGS. 3A and 3B show real parts and imaginary parts and FOM of refractive indices of three-layer fishnet metamaterial (MM) slab for liquid crystal (LC) aligned with x and z axes.
Figure 3B:
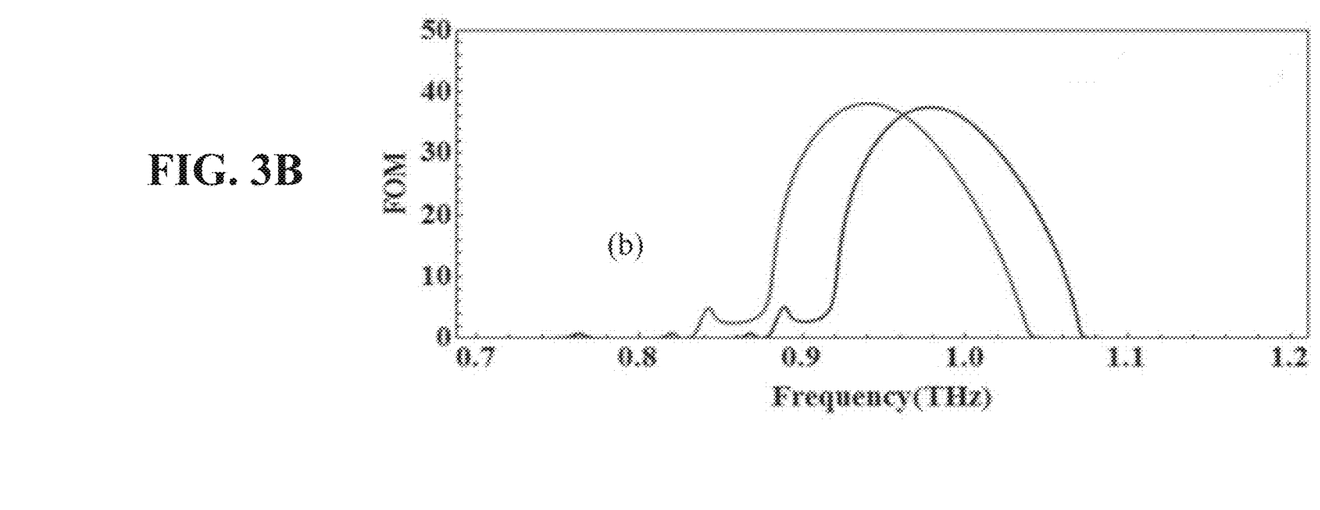

To design a physical TFMM prism, it is needed to consider the geometry of a single unit cell of TFMM, because it determines the aspect ratio of the fishnet prism structure. The number of unit cells has to be large enough so that the prism can be considered a periodic structure. For example, the equivalent angle of a TFMM prism is determined by the ratio between h and w, as shown in FIG. 2. Based on Snell's law as follows $$\theta_a = \sin^{-1}\left(\frac{n_p}{n_a}\sin\theta_p\right) \quad (3)$$

when the wave is incident normal on the TFMM prism, the incident angle to the inclined surface of the prism is $\theta_p=11.09°$, and the refractive index change is the same as the result from FIG. 3A at 0.856 THz, the output angle $\theta_a$ changes from −47.8° to −1.1° resulting in a 46.7° tuning angle. There are two methods to increase the tuning angle: (i) increasing the OPD between each adjacent unit cell in the x direction; however, increasing the aspect ratio will also increase the total number of TFMM layers required and the fabrication difficulty; and (ii) increasing the resonant strength of the TFMM so that the refractive index change can be increased. Simulation results show that under ideal conditions, the multilayer structure creates a larger FOM, which usually corresponds to larger transmission due to smaller imaginary refractive index, as shown in FIG. 3B.

(ii) Flat TFMM Prism Design

The challenge of fabricating a multilayer TFMM prism can be alleviated with a flat prism structure by combining (i) the concept of beam steering based on OPD and (ii) the large refractive index change of metamaterial near its resonant frequency. To steer the beam by prism, it is not necessary to make the beam steering device in a physical prism shape, as long as the material can create a large OPD varying along the direction perpendicular to the incident electromagnetic (EM) wave. Since TFMM can create large refractive index changes, the fishnet structure can be used as individual electrodes to apply separate electric fields onto the polymer dispersed liquid crystal (PDLC), resulting in a refractive index gradient along the direction perpendicular to incident EM wave, equivalent to a real prism.

For the gradient design, the stacked TFMM structure is replaced by an array of single layer TFMM structures, as shown in FIGS. 4A-4C. To create a large OPD varied along the direction perpendicular to incident EM wave, one can simply apply different external fields to each row or column of this disconnected TFMM array (see FIGS. 4A-4C) or construct a gradient refractive index structure by varying the LC droplet size under each row or column of this disconnected TFMM array (see FIG. 5). Since PDLC is a composite material, the liquid crystal droplet size can be controlled by ultra violet (UV) radiation to form the index of refraction gradient.

Using the same 5CB liquid crystal as an example, the refractive index shifts from −4.4 to −1.3 resulting in a 70% OPD at 0.882 THz. The output angle $\theta_a$ changes from −57.8° to −14.5° resulting in a 43.3° tuning angle. For the electric field applied to a disconnected TFMM array, the deflecting angle can double to 86.6° simply by reversing the magnitude of electric potential or by combining gradient structure and disconnected TFMM, as shown in FIGS. 4A-4C. The deflecting angle can be further increased by carefully selecting an operating frequency. However, it is important to keep FOM as high as possible to maintain high transmission.

(iii) Multifunctional Flat Lens Design

Lenses are the most fundamental optical elements in manipulating electromagnetic waves. Lenses can be used to collimate, reflect, refract, focus or filter EM waves depending on their geometry, curved interfaces and materials. Traditionally, a lens can only be designed to undertake one particular task. As a result, a system usually requires multiple elements and can end up becoming very bulky and complicated. Moreover, the diffraction limit, which is roughly half of the operating wavelength in the medium, poses an inherent constraint to device geometry and a limit to the spatial resolution. An actively-controlled metamaterial lens can overcome these problems, transforming the lens to perform different functions, such as going from focusing to diverging to collimating or to achieve near field or subwavelength focusing by altering the applied voltage.

Figure 6:
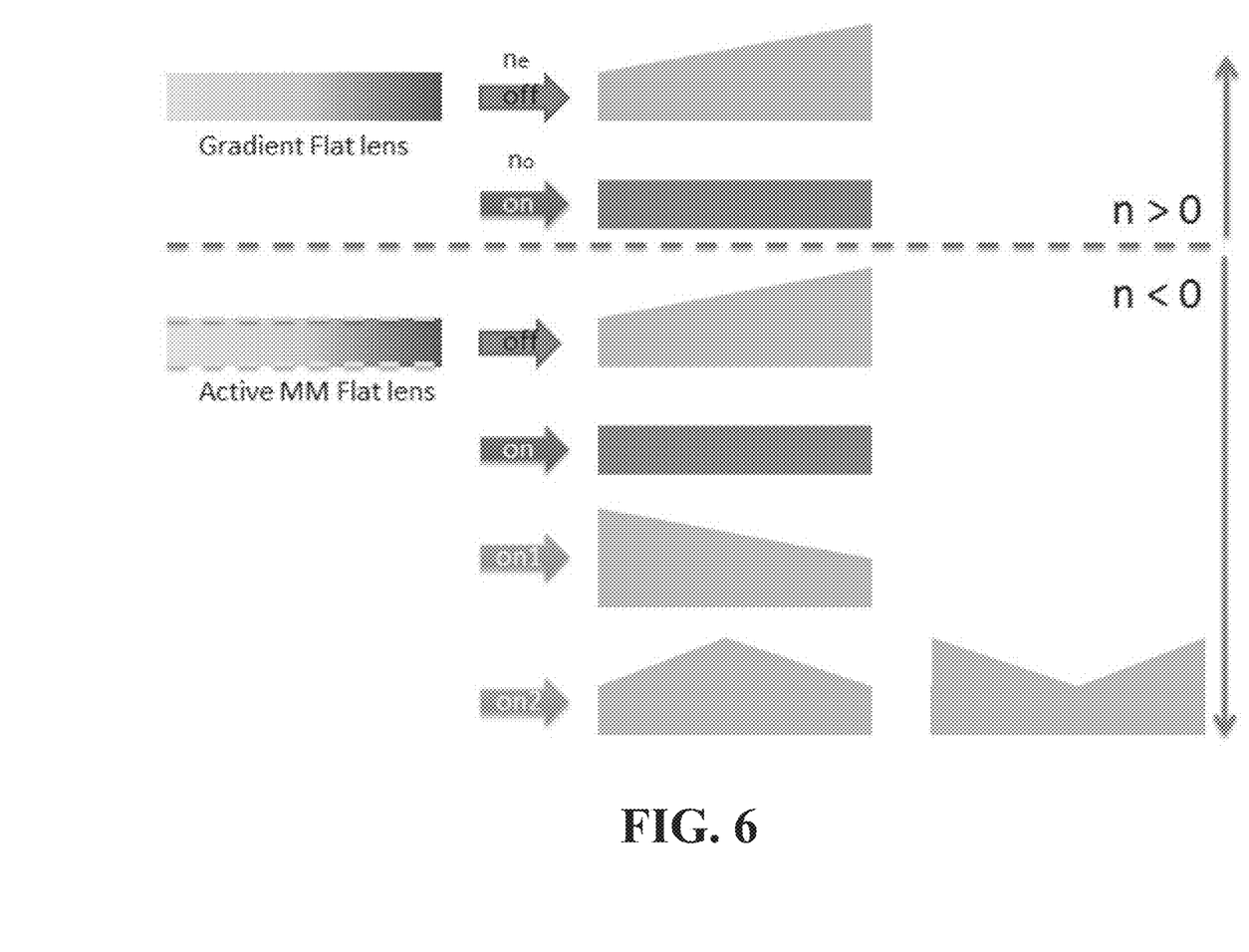
FIG. 6 shows a diagram of a multifunctional flat lens.

A conventional lens shaped with different curves can be operated in positive refractive index, but is constrained by the diffraction limit. However, while the spatial resolution of the lens can be improved by liquid or solid immersion techniques, it is still limited by the refractive index of the materials. As shown in FIG. 6, a gradient flat lens infiltrated with materials such as non-uniform LC cells, can create an optical effect similar to a triangular shape prism. To create such a gradient LC cell, the design uses a UV curable PDLC as a dielectric substrate. By exposing the material at different intensities of UV, LC droplets inside the polymer are forced to form in different sizes, as shown in FIG. 5. Since the ordinary and extraordinary refractive indices of PDLC can be changed corresponding to the average size of the liquid crystal droplets inside the polymer host medium, the material can be exposed at a constantly increasing dosage to achieve the effect of a prism. This concept is used to create a tunable flat lens, a prism with active steering, or an even more complicated lens design depending on how the PDLC substrate is configured. However, this type of flat lens still has a positive refractive index and is constrained by the diffraction limit, and thusly cannot achieve subwavelength focus.

Creating lenses with negative refractive indexes and subwavelength focus capability will require a multifunctional flat lens comprised of the TFMM and a gradient PDLC substrate where the material properties of each individual cell can be altered independently.

Figure 7A:
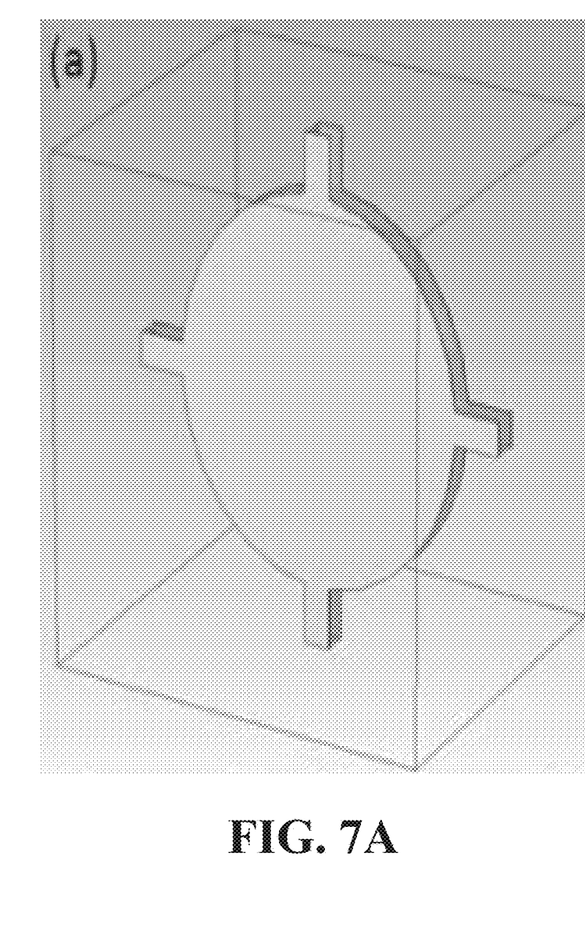
FIGS. 7A, 7B, 7C, and 7D show a dotnet MM unit cell, a holenet MM unit cell, a partially disconnected dotnet MM unit cell and a partially disconnected holenet MM unit cell, respectively.
Figure 7B:
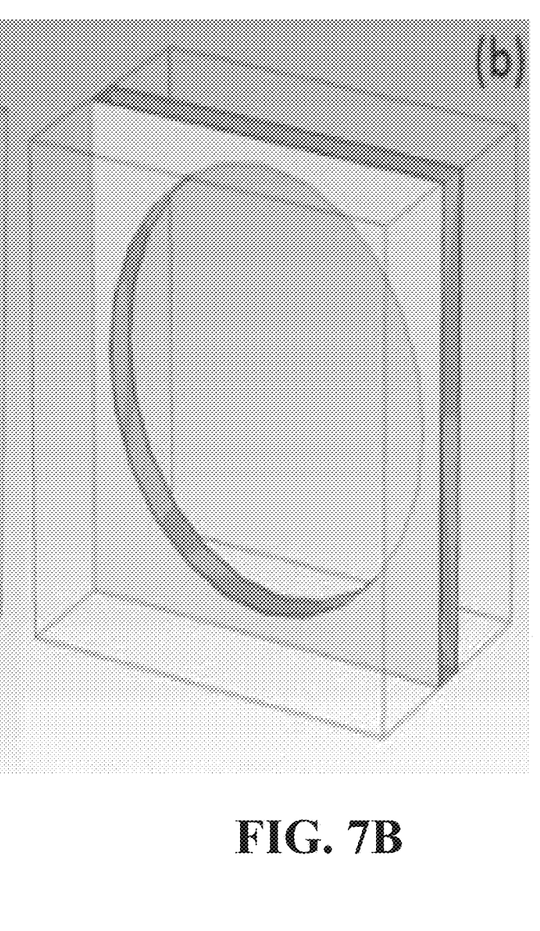
Figure 7C:
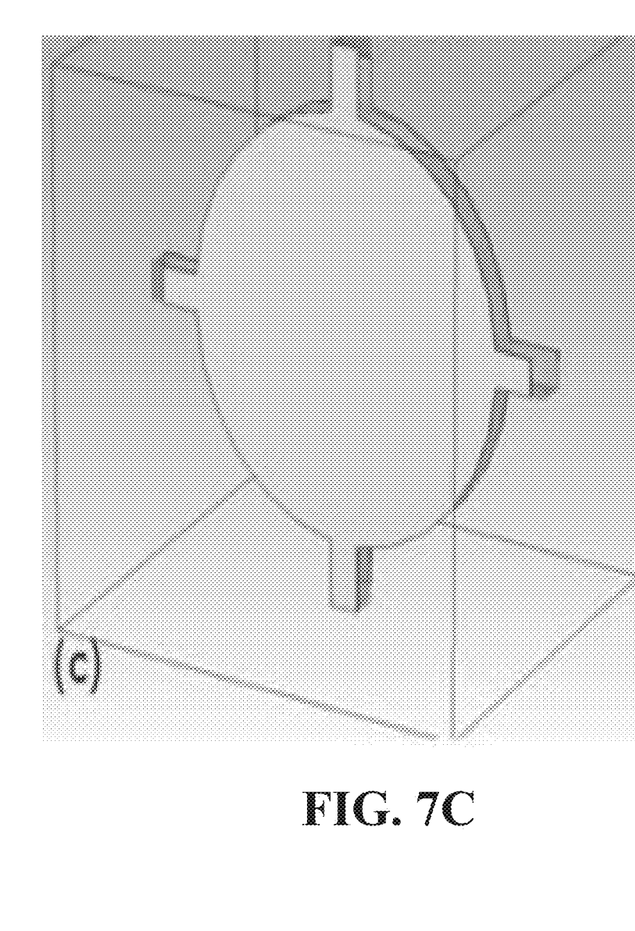
Figure 7D:
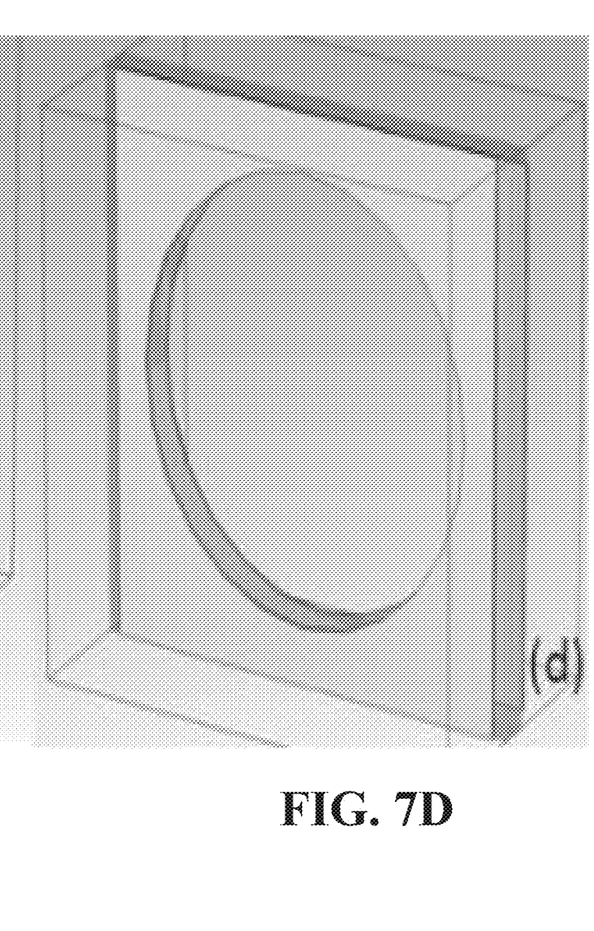
Figure 8:
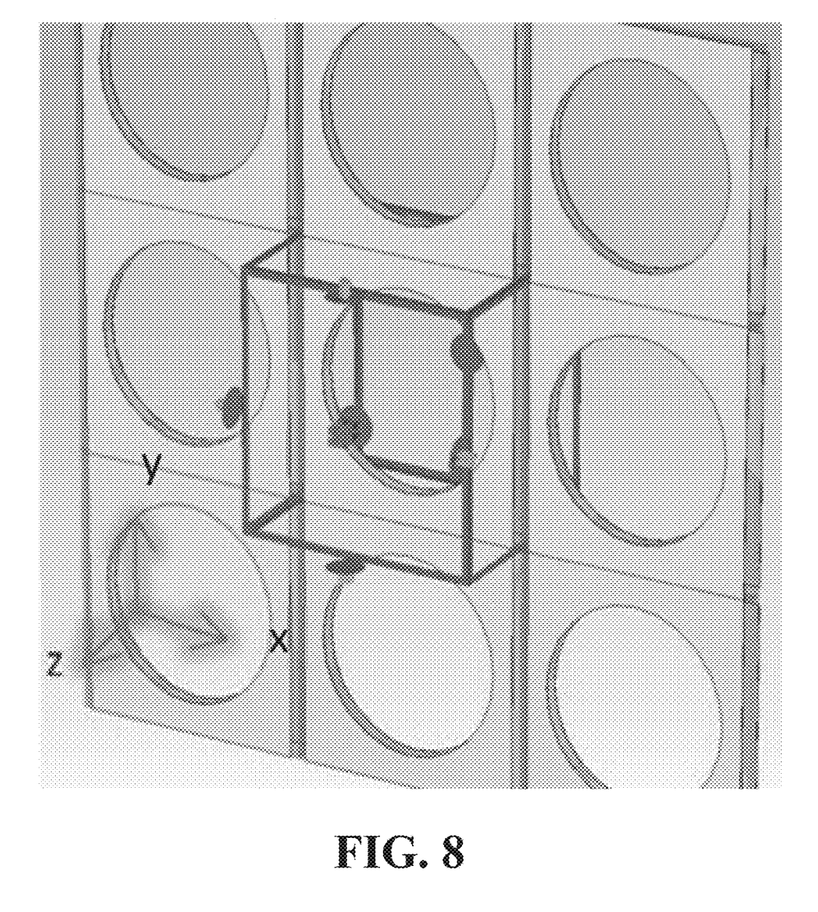
FIG. 8 shows a multifunctional flat lens made by an active metamaterial pattern with disconnected wires.
Figure 9:
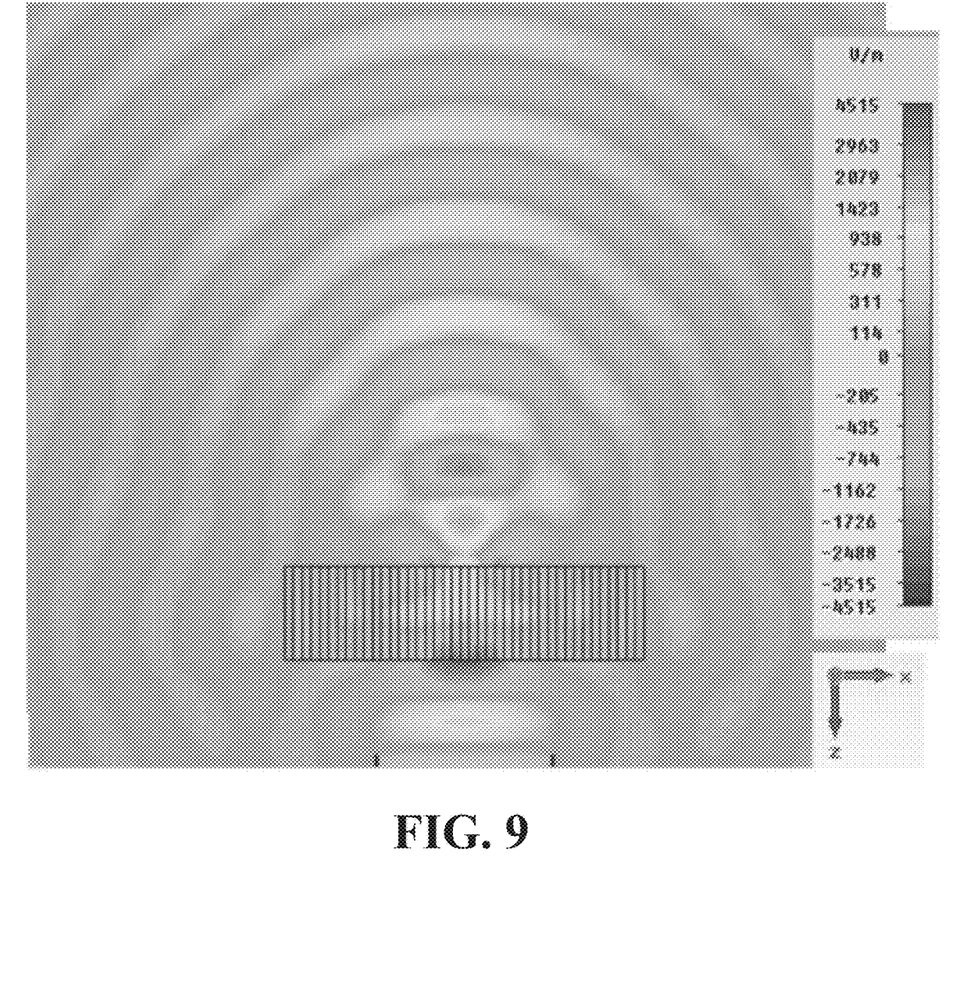
FIG. 9 shows an equivalent beam converter (CST simulation).

As shown in FIGS. 7A-7D, several designs of active metamaterial patterns are proposed to achieve active control of each individual MM unit cell independently. A flat lens composed of the proposed pattern, as shown in FIG. 7D, and is plotted in FIG. 8. The metallic conductors on the 'front' are all connected in the y direction and disconnected in the x direction, and the conductors at 'back' are all connected in the x direction and disconnected in they direction. As a result, each row and column of electrodes can have different voltages applied to create different biasing voltages in the unit cells of a MM slab. FIG. 9 shows an example of a beam converter, simulated by a gradient negative refractive index distribution from −3 at two sides to −1 at the center operate at 1 THz of a flat lens. A plane incident wave is converged to a focal point and the wave front is changed to a circular wave front. In addition, the transformation optics technology is the key to providing a well calculated gradient distribution of refractive indices of the material, which is required to create a Luneburg lens or a perfect cloaking system.

Fabrication

Figure 10:
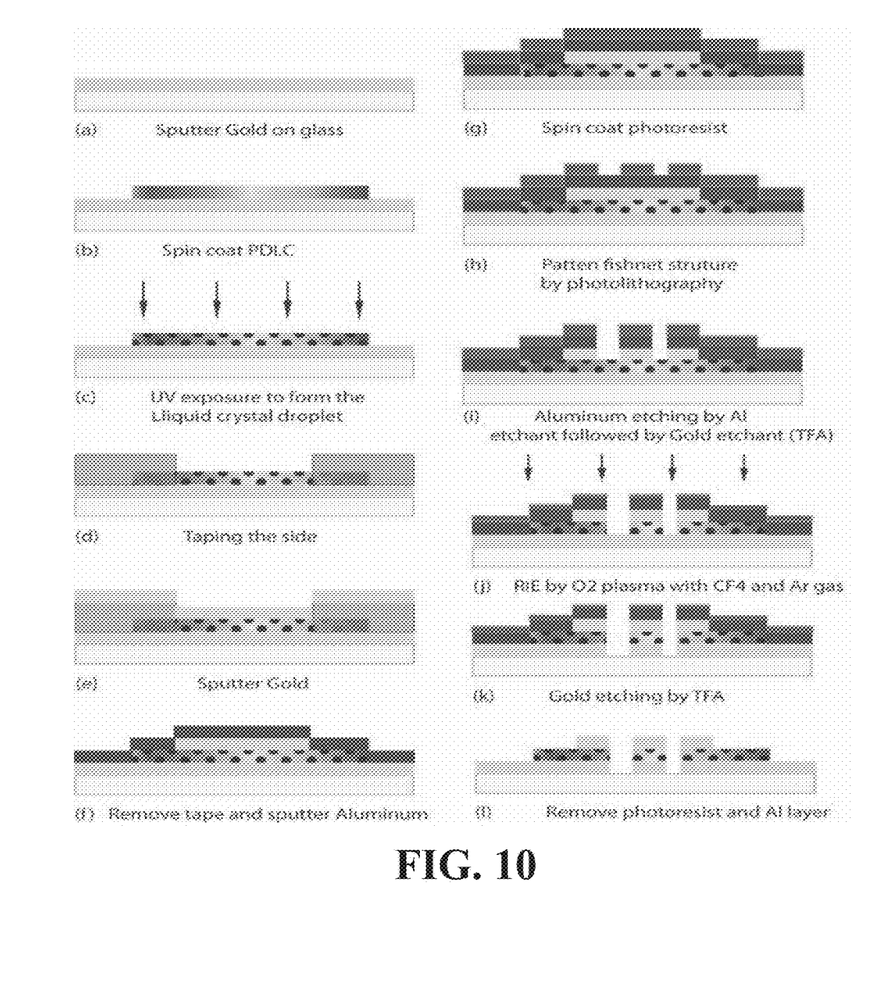
FIG. 10 shows a schematic diagram of fabricating a single-layer TFMM prism by a wet and dry etching method.

For the first part of fabrication, PDLC polymer is a two phase material consisting of host and active material. For PDLC, the active material is liquid crystal. The fabrication temperature should be kept under the polymers' glass transition temperatures to maintain structure morphology and the active materials should also be processed after polymerization. The strategy of depositing the active materials will rely on low temperatures and processes like spin coating or siphoning to maintain the polymer morphology. The conventional wet etching and dry etching for etching PDLC is tested. Second, depositing metal on PDLC and EO polymer is not difficult by low temperature deposition methods such as sputtering deposition. However, special attention is required during metal deposition to keep the processing temperature low. Patterning metal like gold or silver by wet or dry etching without damaging the PDLC is a challenge; special recipes must be applied and the process must be monitored and refined during this time to ensure good results. A schematic process combing wet and dry etching of making TFMM prism is shown in FIG. 10.

Alternatively, focused ion beam (FIB) or e-beam lithography might be able to bypass the etching selectivity issues that plague the wet and dry etching process. For FIB procedures, all the layers can be deposited first and then etched in a single run. Resolution for the FIB is in the tenths of nanometers, and there is no material selectivity problem. However, this process will require the layers to be carefully chosen in terms of their thickness so the layers can be penetrated by the ion beam. For e-beam, the materials will need to be selected so that they can react to the e-beam for the appropriate process. For exposure, the materials need to have high adsorption in DUV. As with FIB lithography, thickness also needs to be thin enough for the e-beam to penetrate. Normally this depends on the materials and the power of the e-beam system.

iv) Handheld THz Scanning Imaging System with the Proposed Beam Steering Device and Multifunctional Flat Lens System In one embodiment, an example of a real time scanning based THz imaging system is constructed based on combining a beam steering device and a multifunctional flat lens with continuous wave InGaAs based photomixer modules powered by two tunable distributive feedback lasers with built-in optical isolators and a fiber-optic beam combiner. When packaged, a hand-held THz camera embedded with the gradient TFMM provides a rapid-scanning, high FOV and resolution THz imaging system (referring to FIG. 1). Multifunctional tunable active metamaterials also allow for shaping the beam and multiple-wavelength. To capture the image, the detector unit with the same tunable lens will be placed on the same side as the emitter like the handheld unit (referring to FIG. 1). A THz incident beam is reduced, collimated and deflected into a 2D scanning either in a raster, spiral or Lissajous pattern, by means of an electrical or electromagnetic input to the multifunctional tunable active metamaterials thus illuminates the area of interest. THz image is then obtained by collecting these back-scattered radiations one pixel at a time with an array of photoconductive antenna detectors placing around the THz emitter.

In summary, several advantages of the present disclosure are detailed below.

1. Reduced system size and cost: Replacing the mechanical stage with a beam steering device dramatically reduces the system size. Moreover, with a THz beam steering device, more power can be delivered to a single bolometer or photoconductive antenna sensor to increase the working distance of the THz imaging system while lowering the production cost.

2. Increased stability: Removing the mechanical systems resolves many problems inherent to current mechanical systems, such as mechanical fatigue, limited FOV, instability (can be sensitive to ambient vibration without feedback control), signal drift, and low, fixed spatial resolution.

3. Increased scanning speed and Resolution: Eliminating mechanical actuation allows for rapid scanning speed (up to 1 kHz range for PDLC and 100 GHz for EO polymer), increasing spatial resolution (e.g. more lines per scan). Faster scans also result in a more efficient test range and also is immune from source output instabilities on a slower scan.

4. Large FOV: Using a gradient and TFMM structure for beam steering creates a large and variable FOV that can reach up to 90°.

5. Broadband Frequencies and Optical Zoom: Ability to transmit multiple wavelengths and variable zoom without loss of resolution (large depth of field). This is made possible by the broadband frequency response and voltage control of the electro-optic actuators for light beam deflection. The focus adjustment procedure is significantly simplified due to a voltage controlled multifunctional lens system in the scanner, allowing rapid focus adjustment during use. Optical magnification is also simplified, as the zoom-in and zoom out functions are now controlled by the displacement of the voltage controlled beam deflectors.

6. Auto focus: Multifunctional tunable active MMs provide multi-wavelength diagnostics and beam shaping, beam manipulation which can be used for auto focusing and image and chromatic distortion correction. It can also create sub-wavelength focusing lenses by having a negative refractive index.

7. Real time scanning: A true, real-time THz broadband scanning image system can be created using a continuous wave photomixer system (currently, the system has a fiber pigtailed dual laser system covering 0.2-1.2 THz, can be expanded to 2.7 THz with addition of a third laser).

8. Safety: THz waves are non-ionizing, making them biologically safe as well as non-damaging to materials at modest intensities. Because of their longer wavelength, THz imaging uses lower energy photons (on the order of one millionth that of X-ray photons) and is safer during operation than X-ray analysis. Terahertz therefore offers a true noncontact, nondestructive alternative to other electromagnetic radiation.

9. Applications and Advances: The proposed beam steering device will lead to significant advances in THz image technology where medical imaging, biological and chemical analysis and super lenses will benefit from the compact design, low cost, and obvious advantage of large refractive index change. Ultimately, the proposed integrated image system leads directly to portable THz scanner systems. With a system that can be operated from a laptop or other portable monitoring system, an operator will be able to utilize real-time THz analysis while in the field (e.g. will allow new applications such as real time monitoring and data gathering during a flight test for an aircraft.).

Although the present disclosure has been described with reference to the preferred embodiments, it will be understood that the disclosure is not limited to the details described thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A Terahertz (THz) imaging system comprising a THz electromagnetic wave manipulating device, the THz electromagnetic wave manipulating device being formed by at least one layer of a tunable fishnet metamaterial (TFMM) array, the TFMM array having a plurality of connected or disconnected TFMM unit cells, wherein each of the TFMM unit cells comprises a tunable fishnet metamaterial and is used as an individual electrode for applying a respective electrical field to an electro-optic material embedded in the tunable fishnet metamaterial to result in a user defined gradient refractive index profile along a direction perpendicular to a THz incident electromagnetic wave, the electro-optic material comprising an electro-optic polymer, a liquid crystal, a polymer dispersed liquid crystal or a polymer liquid crystal.

2. The THz imaging system of claim 1, wherein the THz electromagnetic wave manipulating device comprises a stacked fishnet prism with a right triangle shaped prism structure formed by multiple layers of TFMM array for creating optical path differences along the direction perpendicular to the THz incident electromagnetic wave.

3. The THz imaging system of claim 1, wherein the THz electromagnetic wave manipulating device comprises a flat TFMM prism having a plurality of disconnected TFMM unit cells used as individual electrodes to apply separate electric fields to the electro-optical materials, resulting in a refractive index gradient for the flat TFMM prism along the direction perpendicular to the THz incident electromagnetic wave.

4. The THz imaging system of claim 1, wherein the THz electromagnetic wave manipulating device comprises a flat TFMM prism having a plurality of disconnected TFMM unit cells, the electro-optic material of each of the TFMM unit cells having a different liquid crystal droplet size, resulting in a refractive index gradient for the flat TFMM prism along the direction perpendicular to the THz incident electromagnetic wave.

5. The THz imaging system of claim 1, wherein the THz electromagnetic wave manipulating device comprises a TFMM prism with a gradient shaped structure.

6. The THz imaging system of claim 1, wherein each of the TFMM unit cells has a pattern that is a square shape, a diamond shape, a polygonal shape, a hollow cross shape or a circular shape.

7. The THz imaging system of claim 1, wherein each of the TFMM unit cells has a circular shape and is in the form of a dotnet metamaterial (MM) unit cell, a holenet MM unit cell, a partially disconnected dotnet MM unit cell or a partially disconnected holenet MM unit cell.

8. The THz imaging system of claim 1, wherein the THz electromagnetic wave manipulating device is a two-dimensional (2D) beam steering device that deflects a THz incident beam into a 2D scanning in a raster, spiral or Lissajous pattern.

9. The THz imaging system of claim 8, further comprising a THz continuous wave source, wherein the THz continuous wave source is a quantum cascade laser, a photoconducting antenna or photoconductive based photomixers powered by two tunable distributive feedback lasers with built-in optical isolators and a fiber-optic beam combiner.

10. The THz imaging system of claim 8, further comprising an array of integrated THz detectors for receiving reflected signals that are converted into a 2D THz image.

11. The THz imaging system of claim 8, wherein the 2D beam steering device comprises a stacked fishnet prism with a right triangle shaped prism structure formed by multiple layers of TFMM array for creating optical path differences along a direction perpendicular to the THz incident beam to achieve beam steering.

12. The THz imaging system of claim 8, wherein the 2D beam steering device comprises a flat TFMM prism having a plurality of disconnected TFMM unit cells used as individual electrodes to apply separate electric fields to the electro-optical materials, resulting in a refractive index gradient for the flat TFMM prism along a direction perpendicular to the THz incident beam to achieve beam steering.

13. The THz imaging system of claim 8, wherein the 2D beam steering device comprises a flat TFMM prism having a plurality of disconnected TFMM unit cells, the electro-optic material of each of the TFMM unit cells having a different liquid crystal droplet size, resulting in a refractive index gradient for the flat TFMM prism along a direction perpendicular to the THz incident beam to achieve beam steering.

14. The THz imaging system of claim 8, wherein the 2D beam steering device comprises a TFMM prism with a gradient shaped structure for creating optical path differences along a direction perpendicular to the THz incident beam to achieve beam steering.

15. The THz imaging system of claim 1, wherein the THz electromagnetic wave manipulating device is an actively-controlled multifunctional flat lens configured by applying a different electric voltage to each of the TFMM unit cells to create a different bias voltage in the electro-optic material in each of the TFMM unit cells.

16. The THz imaging system of claim 15, wherein each of the TFMM unit cells has a pattern that is a square shape, a diamond shape, a polygonal shape, a hollow cross shape or a circular shape.

17. The THz imaging system of claim 15, wherein each of the TFMM unit cells has a circular shape and is in the form of a dotnet metamaterial (MM) unit cell, a holenet MM unit cell, a partially disconnected dotnet MM unit cell or a partially disconnected holenet MM unit cell.

* * * * *